United States Patent [19]
Petrick

[11] Patent Number: 5,656,054
[45] Date of Patent: Aug. 12, 1997

[54] PROCESS AND DEVICE FOR REHEATING GLASS GOBS

[75] Inventor: Gotthard Petrick, Weisswasser, Germany

[73] Assignee: AGA Aktiebolag, Lidingo, Sweden

[21] Appl. No.: 408,275

[22] Filed: Mar. 21, 1995

[30] Foreign Application Priority Data

Mar. 22, 1994 [EP] European Pat. Off. ............. 94104511

[51] Int. Cl.⁶ .......................... C03B 5/235; C03B 5/435
[52] U.S. Cl. ................................ 65/127; 65/227
[58] Field of Search ..................... 65/65, 127, 120, 65/227, 252

[56] References Cited

U.S. PATENT DOCUMENTS 2,074,974  3/1937  Stewart.
4,065,284 12/1977 Mang et al. ..................... 65/114
5,364,426 11/1994 Richards ........................ 65/474

FOREIGN PATENT DOCUMENTS 594615  3/1934  Germany.
121100 12/1918  United Kingdom.

*Primary Examiner*—Lyle A. Alexander
*Attorney, Agent, or Firm*—Pearne, Gordon, McCoy & Granger LLP

[57] ABSTRACT

A process and a device for reheating gobs of glass by means of a reheating drum are characterized by the fact that the heat-insulating lining of the reheating drum has a low heat-penetration factor, and an energy-rich combustion-gas mixture is used. In this way, the inner surface of the lining is heated to a temperature of at least roughly 1500° C. The short-wave radiant heat on the surface of the lining shortens the heating cycle and thus allows discontinuous operation with corresponding energy savings.

18 Claims, 1 Drawing Sheet

PROCESS AND DEVICE FOR REHEATING GLASS GOBS

BACKGROUND OF THE INVENTION

When articles are being processed in the plastic state, especially on a glass-blower's pipe, it may be necessary to reheat the gobs or the parison after they have cooled too much (reheating). In the state of the art, a so-called reheating drum is used for this. This is a hollow cylindrical body open in front, which has a gas burner and a heat-resistant brick lining. The gob dropped through the open front or on the pipe into the drum is rinsed with hot gas around it produced by a gas-air burner. This keeps the reheating drum at a high enough temperature constantly and keeps it constantly heated, which results in a correspondingly high gas consumption. Accumulation of exhaust gas is high.

SUMMARY OF THE INVENTION

The invention seeks to avoid these disadvantages. It does so by heating the surface of the lining of the reheating drum to a temperature of at least roughly 1500° C., preferably roughly 1700° C., whereby faster heating of the glass gob makes it possible, when a lining with a heat-penetration count of $\sqrt{\lambda C \rho} \leq 15$ (at 1000° C.) and an energy-rich combustion-gas mixture are used, to have discontinuous operation. The term "heat-penetration count" refers to thermal activity of the lining. The variable in the equation are as follows:

$\lambda$ is thermal conductivity (W/mK);

C is specific heat (KJ/Kgk); and $\rho$ is density (Kg/m$^3$).

Using an energy-rich combustion-gas mixture like gas/oxygen and heating the inside of the reheating drum to the specified degree is surprising since such high temperatures for heating the glass article were formerly thought to be neither necessary nor advantageous. Namely because of the limited heat conductivity of the glass material, increasing the temperature of the gas was thought to cause only a greater heating and, potentially, unfavorable overheating of the areas near the surface. Until now, therefore, "gentle" heating by the prior methods was considered reasonable. Until now, this view was actually accurate for heating the glass gob mainly by heat transfer from the gas flowing around it. But the invention achieves a special effect in that, in addition to the heat transfer from the gas, the heat radiating from the surrounding wall provides substantial heat. This radiant heat is capable of reaching even deeper areas of the glass gob. This reduces the reheating time, without overheating the surface of the glass.

The goal of the invention is difficult to reach with known reheating drums and the linings used in them. For one thing, the high temperature would sharply reduce the life of the brick lining. And the heat loss in the intervals between use would be too great with the usual constant heating of the drum. The invention's choice of a lining with a low heat-penetration factor helps the surface of the lining reach the high temperature sought in a very short time. This makes possible discontinuous operation, in which the device is turned on only when needed, and thus a substantial reduction in gas consumption and in the amount of gas expelled is achieved. One suitable lining material is, for example, a mineral fiber material, which preferably has a felt structure.

According to another feature of the invention, the combustion-gas inlet into the reheating drum is arranged tangentially. This makes the inside surface of the drum rinse evenly, although the amount of hot gas is considerably reduced due to the use of an energy-rich combustion-gas mixture compared to the state of the art. The fast, circling stream of combustion gas stays close to the surface of the lining, while slower portions of gas are pushed aside. This gas guide also provides good, even rinsing around the glass gob.

The invention will be explained in greater detail below with reference to the drawings, which show one advantageous example of embodiment.

DESCRIPTION OF THE PREFERRED EMBODIMENT

Figure 1:
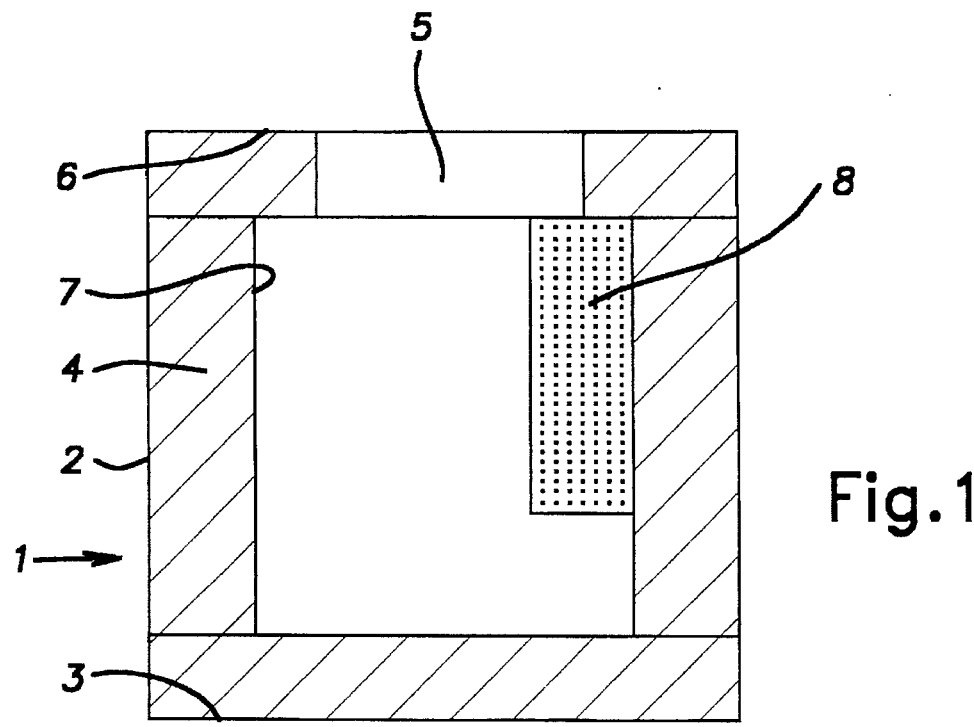
FIG. 1 is a cross-sectional view taken along the longitudinal axis of a preferred embodiment reheating drum in accordance with the present invention.
Figure 2:
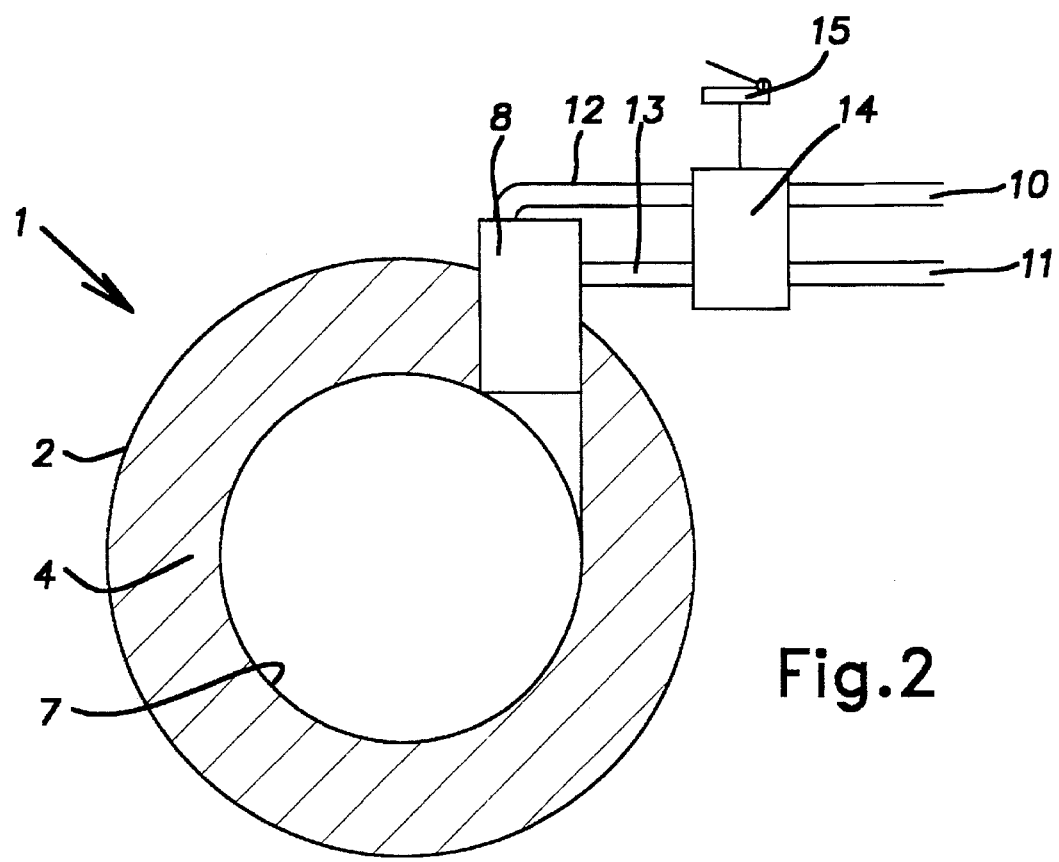
FIG. 2 is a cross-sectional view taken perpendicularly to the longitudinal axis of the preferred embodiment reheating drum, illustrating schematically controls utilized for operating the drum.

As can be inferred from the drawings, the reheating drum 1 is shaped like a pot with cylindrical side walls 2, a bottom wall 3 and a top wall 6, which have several centimeters of thick lining 4 made of an insulating material. The top wall 6 contains an opening 5, whose diameter in the example shown is somewhat smaller than that of the inner circumference 7. The top wall 6 can be changed conveniently, so that different sized openings can be chosen depending on the space requirement for the glass gob. The smaller the diameter, the lower the heat loss.

In the inner circumference 7 of the side wall lining 4, there is a gas burner 8, whose combustion gases flow roughly tangentially into the inside of the reheating drum and flow on a screw-like path along the inner surface of the lining 7 to the outlet hole 5.

The lining 4 consists of a mineral-fiber felt with sufficient temperature resistance. The fibers are composed of aluminum oxide, for example, The material available from the company Aug. Rath jun., Vienna, under the name KVS 181/400 has proven useful, for example. In the temperature range between 800° C. and 1600° C., the heat conductivity factor is between 0.19 and 0.43 W/mcal. The specific heat is 1.1 kJ/kcal, and the density 400 kg/cubic meter. The heat penetration factor is therefore much lower than the conventional linings. This is especially true of lower temperature ranges which are important to the invention in terms of short heating time.

The burner 8 is supplied with natural gas and oxygen through the lines 10, 11 and 12, 13 via a control device 14, as soon as a foot pedal 15 is pressed. The control device 14 determines the amount and the ratio. If a reheating drum with an inside diameter from 15 to 40 cm is used, the burner is then operated, for example, at a power of 50 to 100 kW. This causes the reheating drum to heat up (more precisely: the inner surface 7 of the lining 4) in 10 to 20 seconds to incandescence (temperature approximately 1720° C.). At larger or smaller drum diameters, correspondingly larger or smaller heat factors are used. As soon as the respective reheating cycle is over, the gas supply is shut off again by means of the pedal 15.

It has been shown that reheating drums designed like the one in the invention can be designed with a smaller than conventional inside diameter. This is due to the fact that with conventional drums, to achieve the necessary reheating, there must be a larger volume of hot gas than the one in the invention and, considering any influence on the form of the glass article in the reheating drum, the gas speeds should not be too high.

What is claimed is:

1. A process for reheating gobs of glass disposed within a reheating drum, said drum having a heat-insulating lining disposed on an interior surface of said drum and a device for supplying hot gas to said interior of said drum resulting in said hot gas surrounding said glass gob and thereby spacing said glass gob from said heat-insulating lining, and said drum being adapted for reheating said glass gobs, said process comprising heating said lining to a temperature of at least about 1500° C. by exclusively using said hot gas.

2. A process according to claim 1, further comprising supplying a mixture comprising natural gas and oxygen to said device.

3. A process according to claim 1 or 2, wherein said device is operated discontinuously.

4. A device for reheating glass gobs, said device comprising a reheating drum (1) having a heat-insulating lining (4) disposed on the interior surface of said drum and a gas burner (8) in communication with said interior of said drum, wherein said lining (4) has a heat-penetration count less than or equal to 20 at 1000° C., said drum is particularly adapted for reheating said glass gobs, and said gas burner is the sole source of heat.

5. A device for reheating glass gobs, said device comprising a reheating drum (1) having a heat-insulating lining (4) disposed on the interior surface of said drum and a gas burner (8) in communication with said interior of said drum, wherein said lining (4) comprises a mineral fiber material, said device is particularly adapted for reheating glass gobs, and said burner is the exclusive source of heat for reheating said glass gobs.

6. A device according to claim 4 or 5, wherein said gas burner is adapted for receiving and combusting a mixture comprising natural gas and oxygen.

7. A device according to claim 4, wherein said reheating drum further has a combustion-gas inlet arranged tangentially with respect to said interior surface of said reheating drum.

8. A device according to claim 4, wherein said gas burner (8) is adapted to heat the surface (7) of said lining (4) from ambient temperature to incandescence in a few seconds.

9. A device according to claim 4, said device further comprising a control device (14, 15) for providing discontinuous operation of said device.

10. A device according to claim 5, wherein said reheating drum further has a combustion-gas inlet arranged tangentially with respect to said interior surface of said reheating drum.

11. A device according to claim 5, wherein said gas burner (8) is adapted to heat the surface (7) of said lining (4) from ambient temperature to incandescence in a few seconds.

12. A device according to claim 5, said device further comprising a control device (14, 15) for providing discontinuous operation of said device.

13. A device according to claim 6, wherein said reheating drum further has a combustion-gas inlet arranged tangentially with respect to said interior surface of said reheating drum.

14. A device according to claim 6, wherein said gas burner (8) is adapted to heat the surface (7) of said lining (4) from ambient temperature to incandescence in a few seconds.

15. A device according to claim 6, said device further comprising a control device (14, 15) for providing discontinuous operation of said device.

16. A device according to claim 7, wherein said gas burner (8) is adapted to heat the surface (7) of said lining (4) from ambient temperature to incandescence in a few seconds.

17. A device according to claim 7, said device further comprising a control device (14, 15) for providing discontinuous operation of said device.

18. A device according to claim 8, said device further comprising a control device (14, 15) for providing discontinuous operation of said device.

* * * * *